United States Patent [19]

Levy

[11] 4,075,398
[45] Feb. 21, 1978

[54] MEANS OF PROVIDING PRESSURE RELIEF TO SEALED GALVANIC CELL

[75] Inventor: Isaac I. Levy, Cambridge, Wis.

[73] Assignee: ESB Incorporated, Philadelphia, Pa.

[21] Appl. No.: 735,574

[22] Filed: Oct. 26, 1976

[51] Int. Cl.² ............................................. H01M 2/12
[52] U.S. Cl. ..................................... 429/56; 220/203; 29/623.2
[58] Field of Search ....................... 429/54, 53, 55, 56; 220/203, 207; 361/433

[56] References Cited

U.S. PATENT DOCUMENTS

| | | | |
|---|---|---|---|
| 2,227,319 | 12/1940 | Pontis et al. | 429/56 |
| 2,301,724 | 11/1942 | Vischer | 220/203 |
| 2,766,408 | 10/1956 | Georgiev et al. | 429/56 |
| 3,013,190 | 12/1961 | Nieders | 429/56 |
| 4,008,354 | 2/1977 | Fitchman | 429/56 |

*Primary Examiner*—Donald L. Walton
*Attorney, Agent, or Firm*—Gilbert W. Rudman; Anthony J. Rossi; Gary V. Pack

[57] ABSTRACT

The mouth of a tubular cell envelope is closed by compressing into it an end cap formed of a resilient plastic exhibiting a low creep characteristic. An elongate terminal is inserted through the end cap and into the cell interior, and a vent passage is formed in the cap at a location between the electrode and the cap edge. In one embodiment a plug is placed in the passageway before assembly of the end cap into the envelope such that the radial compression of the end cap by the surrounding envelope clenches the plug more tightly in the passageway. In a preferred embodiment, the plug is formed with a hollow core and the outer end of the passageway is counterbored or chamfered to allow the plug to be blown clear of the passageway by undesirably high pressure generated within the cell.

8 Claims, 4 Drawing Figures

MEANS OF PROVIDING PRESSURE RELIEF TO SEALED GALVANIC CELL

BACKGROUND OF THE INVENTION

The present invention relates to galvanic cells, and more particularly to improved means for venting sealed galvanic cells when inordinate pressure is generated therein.

A common type of sealed galvanic cell comprises a relatively deep, tubular envelope, usually drawn from metal, and a separate cover or end cap which is used to close the envelope after the latter is filled with electrolyte, separators, and other materials depending upon the nature of the cell. Both Leclanche and alkaline cells have been formed in this manner. Although such cells have been produced in a vast array of shapes and sizes, perhaps the most common type of cell constitutes the relatively small, cylindrical sealed cell often broadly termed a "flashlight battery". Of course, sealed cells of the type described are used in countless other types of apparatus, and are formed in many different sizes and capacities.

The construction of such cells is far from simple, and must meet exacting demands with respect to both insulating and sealing capability. In particular, the cell construction must not only be economical, but must be liquid-tight to prevent the escape of the cell contents.

Generally speaking a sealed galvanic cell will theoretically operate at a relatively low internal pressure, which seldom exceeds approximately 1½ atmospheres (absolute). In use, however, this figure is often exceeded. One particularly common cause of severe over pressure is the inadvertent reversal of a cell in an application wherein it is series-connected with two or more other cells. In such a case, the potential of the correctly-aligned cells overcomes that of the reversed cell and causes the reversed cell to charge rapidly. The cell electrolyte then "outgases", gas being developed much more rapidly than it can be re-absorbed by the cell contents. As a result pressure rapidly builds up within the cell and, if not relieved, may cause the cell to burst, dispersing the cell electrolyte and possibly damaging the enclosure in which the cells are disposed.

For the foregoing reasons it has become commonplace to provide venting or pressure relief mechanisms in sealed cells. Such venting mechanisms ordinarily allow gas to escape from the cell under overpressure conditions along a predetermined path, and are intended to relieve gas pressure before the cell bursts. While in principle the provision of a pressure-relief vent is straightforward, due to the small size and relatively low price of the more popular-sized cells the design of appropriate venting mechanisms is difficult.

Basically, three types of venting systems have evolved for use in small sealed cells. With one approach a spring-loaded valve is provided, the valve being biased by the spring with a pressure which is overcome during outgassing conditions, temporarily opening the valve against the pressure of its spring. With another approach a venting passageway is covered by a resilient member, such as a plastic washer. The resilient member can be temporarily deformed by excess pressure within the cell, forcing it away from the venting opening and allowing it to escape from within the cell. Finally, a currently popular approach with small-sized sealed cells is to provide a weakened section or diaphragm which is ruptured by unduly high pressures within the cell. In one version of this approach, the diaphragm is simply stretched to the bursting point by internal pressure; in another, the diaphragm is urged outwardly against a pointed anvil or the like which punctures the diaphragm, allowing the pent-up gases to escape. The latter two approaches have found favor with manufacturers of small sealed cells due at least in part to their simplicity, which allows them to be easily miniaturized for use with small cells. However, application of these or other known prior art systems to the smallest cells, for instance AA size cells, has been extremely difficult. Cells of the AA size conventionally exhibit a diameter in the range of one half inch. The center electrode or "nail", in order to have the rigidity necessary to withstand various manufacturing operations, and to make adequate contact with an upper electrode member, conventionally has a diameter of approximately one sixteenth inch. When constraints provided by still other structural elements are considered, very little space is left for a vent. Still further, due to the extremely small size of the cell complex mechanisms are precluded, and diaphragms and the like are extremely difficult to execute due to the extreme precision which is required. Further, the very small surface area afforded by the axial ends of the cell dictates that diaphragms, if used, be of extremely small area which further increases the criticality of their dimensions and lessens the tolerances of the structure.

Accordingly, it will be seen that it would be highly desirable to provide an improved venting structure for small, sealed galvanic cells.

It is accordingly an object of the present invention to provide an improved venting system for sealed galvanic cells.

Another object of the invention is to provide a simple vent structure which can be economically adapted to operate at various strictly-defined ranges of pressure.

Yet another object is to provide a venting system that can be mass-manufactured at low cost.

Yet another object of the invention is to provide a venting system whose parameters can be easily changed to allow venting to occur over a broad range of pressures.

SUMMARY OF THE INVENTION

Briefly stated, in accordance with one aspect of the invention the foregoing objects are achieved by providing a generally tubular galvanic cell envelope with a compressively fitted end cap formed of a resilient plastic material which is resistant to attack by the cell electrolyte, and exhibits a low characteristic creep. The end cap is provided with a pair of passages, one for tightly receiving an electrode and the other having disposed therein a plug formed of the same or a different material as the end cap.

In a preferred embodiment, the plug is formed with a hollow core, the dimensions of the core being selected to allow the plug to seat with the requisite tightness in the passage. The outermost end of the passage is spaced from the overlying cell structure so as to allow adequate clearance for the plug.

In a preferred method of forming the cell, the end cap is made somewhat larger than the mouth of the envelope which receives it. A molded plug is placed a predetermined depth into a vent passage in the end cap. After the envelope is filled with electrolyte, separators and other appropriate materials the end cap is forced into the envelope mouth and tightly crimped into place. The lateral compression of the end cap increases the frictional resistance between the plug and passage walls, so that the plug can be caused to release at a predetermined pressure.

With another embodiment the plug is made larger than the passage to provide the necessary interference in the absence of lateral compression of the end cap.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
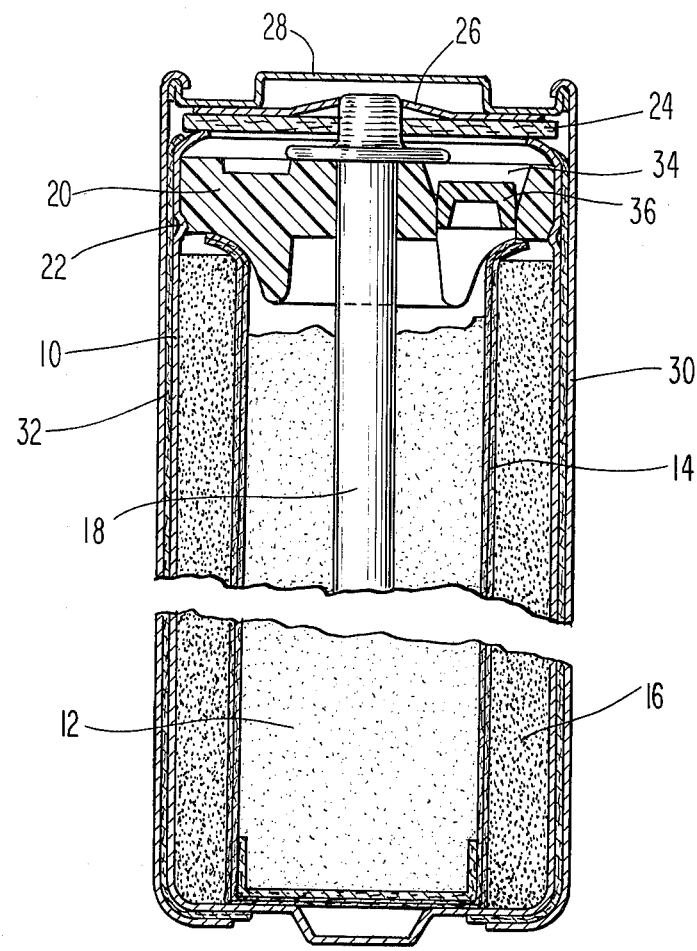
FIG. 1 is a cross-sectional diagram of a sealed galvanic cell of the alkaline type, utilizing the teachings of the present invention.

The cell illustrated in FIG. 1 comprises a centrally-located gelled electrolyte mix 12, surrounded by a separator 14. Disposed concentrically outside the separator is a second mix 16, commonly formed of manganese dioxide or the like. The envelope 10 is conductive, and serves to form the positive electrode of the cell, while a centrally-disposed electrode 18, termed a "nail" forms the inner portion of the negative electrode.

The cell depicted is intended to represent a miniature galvanic cell of the AA size. Such cells are conventionally formed in the shape of a right cylinder, envelope 10 comprising a deep-drawn cylindrical steel tube having an open end or mouth into which the various mixes, separators and the like are placed during manufacture of the cell. The mouth of the cell is closed by a generally planar end cap 20, which seats upon indentations 22 whose primary function is the proper axial location of the end cap. The upper end of nail 18 terminates in a flange seated across the upper surface of end cap 20. Placed over the flange is an annular paper washer 24 which constitutes an insulator for separating the cell envelope from other, conductive members which constitute the outer cap assembly. Finally, surmounting washer 24 is a metal strip 26 having an aperture in the middle, the edges of the aperture being upset to form resilient teeth which, upon being forced over the head of nail 18, grip the head tightly to hold the assembled components in place and further forms a conductive path from the head of nail 18 to an outer cap 28. The outer cap then forms the negative terminal of the cell.

An outer covering 30 is disposed about the lateral area of the envelope and is spaced therefrom by an insulative sleeve 32 which may, for instance, be of paper or the like. The upper ends of sleeve 30 are crimped over the periphery of outer cap 28, and about the planar bottom of envelope 10, to firmly fasten the cell elements together.

In order to afford pressure relief to the interior of the cell end cap 20 is provided with a vent passage, generally indicated at 34. Placed within the passage is a plug 36, substantially as shown. When an inordinate amount of pressure is generated within the cell by the outgassing of the electrode, due to the rapid charging of the cell or to other circumstances the pressure will dislodge plug 36 from the passageway in which it seats, forcing it upwardly until the lower end of the plug clears the upper end of the passage. The gas may then escape through openings in the outer cap (not shown).

In some types of cells the end cap is not clenched or otherwise compressively seated in the cell, but rather is cemented in place. With such cells the plug member 36 is made sufficiently larger in diameter than the passage so that the plug is held tightly in the passage. The depth of insertion of the plug, and the depth of the hollow core, determines the pressure required to dislodge the plug.

In principle, the provision of a plug to be dislodged in an end cap is relatively straightforward; however, implementing the concept in the confines of a relatively small cell of the type shown has presented substantial problems. In particular, placing the plug 36 in the end cap 30 so as to achieve a predictable, consistent relief pressure has constituted a formidable obstacle to the implementation of the design.

The present inventor has discovered that by forming the end cap 20 of a plastic material which is both resilient, yet is resistant to creep, and by force-fitting the end cap into the mouth of the envelope a predictable, tight-fitting relationship between plug 36 and the end cap aperture can be obtained. By "creep" is meant a lasting resiliency, or resistance to "set", of the resilient material so that once compressed it will stay in compression and not relax over an extended period of time. It has been determined that several materials will fill these criteria, chief among them being polysulfone. Polysulfone is available under several proprietary names such as Udel P1700 (manufactured by the Union Carbide Company). Polysulfone is produced by the reaction between the sodium salt of 2,2 bis (4-hydroxyphenol) propane and 4,4'-dichlorodiphenyl sulfone. In its natural and unmodified form, polysulfone is a rigid, strong thermoplastic that is both stable and selfextinguishing. Further, and appropriate to the present application, polysulfone is resilient and exhibits a relatively high creep modulus.

In addition to polysulfone, though not as preferred, is polyphenylene oxide such as that sold under the trade name Noryl by the General Electric Company. Glass filled nylon compounds are also useful in this application. Finally, and least preferred for the present application, is polypropylene. Polypropylene, though relatively inexpensive and easily obtained, exhibits a low creep modulus at extreme temperatures and is thus relatively unsatisfactory for high-quality sealed cells which are to be used under extreme temperature conditions.

Figure 2:
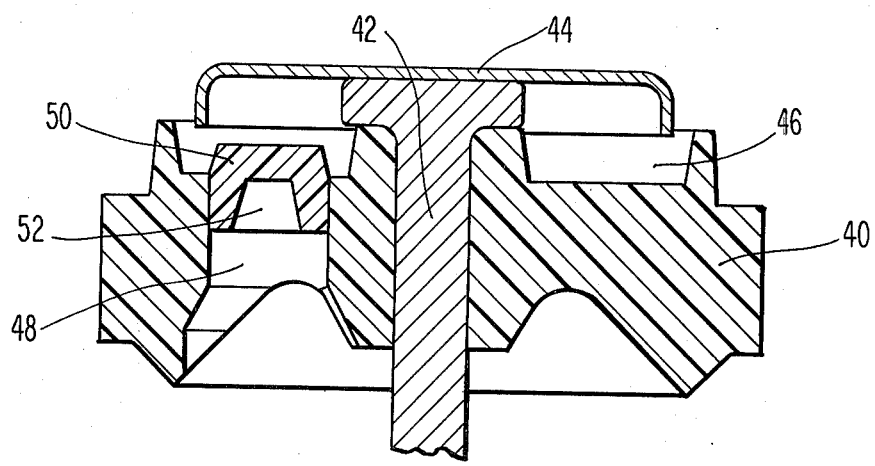
FIG. 2 illustrates an alternative cell construction.

Turning now to FIG. 2, there is shown a modified version of an end cap 40 for use in a sealed galvanic cell. Conventionally a nail 42 extends through the end cap in interfering relationship therewith so as to provide a tight gas and liquid-proof seal. The head of the nail supports an outer cap 44 which, as discussed hereinabove comprises one electrode of the cell, specifically the negative electrode in the case of an alkaline cell. A relieved area is provided around the upper surface of the end cap, and through this surface is formed an annular passage 48. In practice, it has been found advantageous to mold end caps such as those shown in the Figures from polysulfone in an injection molding apparatus, so that passage 48 can be formed in a regular, relatively precise fashion.

As was the case in FIG. 1, a plug 50 is placed in vent passage 48. According to a preferred mode of practicing the present invention the diameters of plug 50 and passageway 48 are substantially identical, with neither clearance nor interference being provided. Insofar as the state of the art, and the equipment utilized, may not allow the two diameters to be precisely equal, it is preferably that the diameter of the plug be larger than that of the passage rather than the converse. This is so that plug 50 may be precisely positioned in passage 48 before assembly of the end cap to the cell. In one mode of carrying out the invention plug 50 is formed in an adjacent cavity, but in the same mold structure, as end cap 40. After the initial forming of the two parts but before they are removed from the mold, plug 50 is urged into passage 48 to a predetermined depth by means of a movable finger or the like. It has been determined that this may be accomplished immediately after molding of the parts without any deformation or adhesion of the parts, despite their frictional engagement. Further it has been found that by coring plug 50, that is by forming the plug with a cavity 52 therein, a more regular and predictable pressure release characteristic will result. This is particularly true if the portion of the plug periphery which engages the passageway is confined to that portion surrounding the core, rather than the portion lying about the solid area of the plug.

By disposing the upper end of the vent passage 48 in spaced relationship to the overlying cell structure, adequate clearance is provided so that the plug can clear the upper edge of the passageway and allow trapped gas to escape. In the present instance the head of nail 42 is of relatively small diameter, so that the structure immediately overlying the top of plug 50 is outer cap 44.

Figure 3:
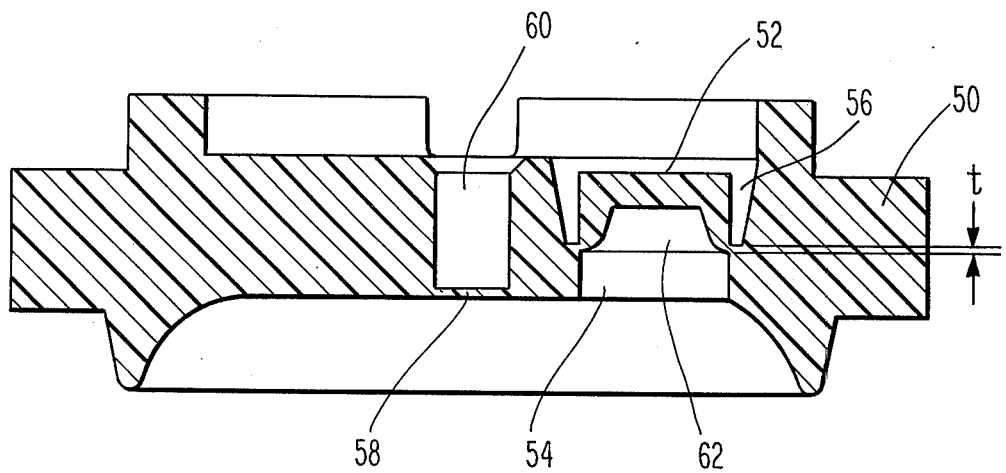
FIG. 3 illustrates an element of a cell formed in accordance with the present invention and in a stage of partial completion.

FIG. 3 illustrates yet another design of end cap in an as-molded form, before placement of the pressure relief plug or nail. In the type of cell for which end cap 50 is designed, the head of the nail (not shown) is provided with a flange of relatively large diameter, much like nail 18 of FIG. 1. Accordingly, in order that plug 52 be able to clear the upper end of passageway 54 a counterbore 56 is formed above the passageway. This has the effect of shortening the passageway or, in effect, lowering the upper surface of the end cap. A thin, rupturable membrance 58 is formed across the bottom of the centrally-located aperture 60 through which a nail is subsequently urged, and serves to aid in providing a pressure-tight seal about the nail shaft.

It will be noted that the plug 52 and the end cap 50 are integrally formed, being connected by a web of thickness t. While the precise dimensions of the structure must be varied to suit a given application and will depend to some extend upon the size and type of construction of the cell, along with the nature of the materials used, in a successfully-tested embodiment thickness t approximated 0.004 inches (0.01mm.). After removal from the mold, the integrally formed plug 52 is forced downwardly, rupturing the thin, connecting membrane. The plug is placed a predetermined distance into passageway 54, again preferably no deeper than the depth of core 62. The effectively zero clearance between the plug and passageway, coupled with the added radial resiliency afforded by core 62, allows the plug to be easily placed to the desired depth yet serves to hold it in the desired position during subsequent manufacturing operations.

Figure 4:
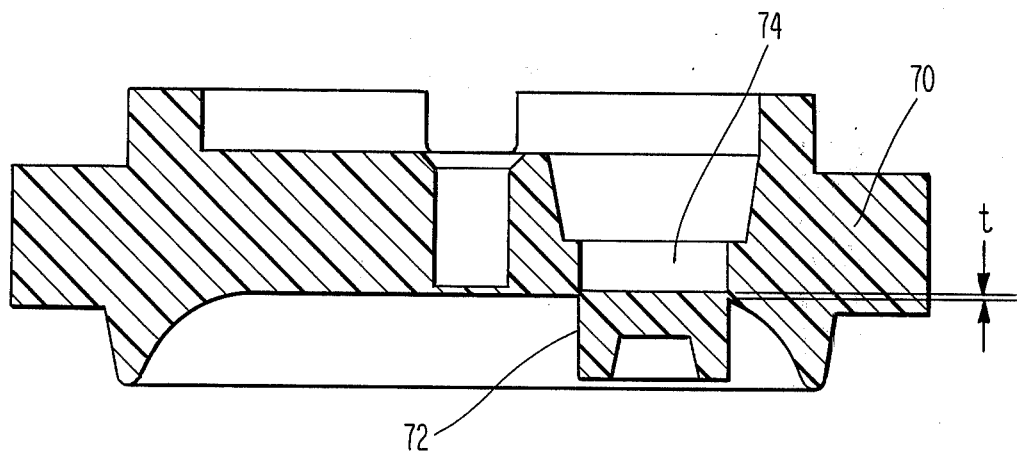
FIG. 4 represents an alternative construction of a cell end cap.

FIG. 4 illustrates an end cap formed in a somewhat different manner than that of FIG. 3. As before, plug 72 is molded integrally with end cap 70 the two portions of the assembly being connected by a web of a thickness t. By forming the elements in the manner shown so that the web connects the uppermost portion of plug 72 with the lowermost portion of passageway 74, it has been found that a more predictable venting relief pressure can be obtained. This is due to the fact that when plug 72 is urged upwardly from its illustrated position so that only the cored area of the plug lies within passageway 74, the lowermost end of the plug clears the irregular, lowermost edge of passageway 74. It will be understood that the roughened areas are caused by the rupturing of the connecting membrane. Accordingly, with the embodiment of FIG. 4 the plug need not traverse a roughened or torn surface as it is forced from within passageway 74 by internal cell pressure.

In the case of all of the above-described end caps, after their formation but before assembly into a sealed cell the vent plugs are urged into their corresponding passageways by a predetermined distance. The amount of insertion of the plug into its passageway determines to some extent the pressure which will be required to dislodge, and thus to vent, the interior of the cell. Another variable which may be readily controlled is the resiliency of the plug. As described above, the resiliency can be controlled by the depth and/or diameter of the hollow area of core formed within the plug. While solid plugs of a rigid material, such as nylon, have been successfully tested, cored plugs are preferred inasmuch as the resiliency afforded by the hollowed center sections allows the plugs to be formed with somewhat less precision than is required for solid plugs. Further, the provision of a hollow or core in the plug allows the designer yet another variable which easily be manipulated to allow for variations in the dimensions of individual molds. It should also be recognized that the cored style of plug can be provided with a chamfer about its upper end so that the entire plug may be seated within a passageway, yet with the periphery of the uppermost or solid portion thereof not engaging the walls of the passageway.

It has been found that upon insertion of the resilient end cap into the mouth of the cell envelope the lateral pressure exerted against the end cap due to crimping of the cell, or due to the interference between the end cap and the cell envelope, actually effects a reduction in the diameter of the vent passage. This phenomenon causes still tighter engagement between the walls of the plug and the passage. Accordingly, it has been discovered that only a slight amount of frictional engagement between the plug and aperture is necessary during the initial insertion of the plug. This frictional engagement insures that the plug will maintain its position in the end cap during the manufacturing operations, yet only relatively small force is needed to initially place the plug. Accordingly, deformation or damage to the plug and the end cap is minimized. The additional tightening of the engagement between the plug and end cap which is achieved by the compressive fitting of the cap within the cell envelope supplies the additional resistance required to cause the venting assembly to resist ordinary pressures within the cell. As will be evident from the foregoing description, certain aspects of the invention are not limited to the particular details of the examples illustrated. It may, for instance, be desired to provide a given cell with a tubular envelope of a non-circular cross-section, or to form the end cap in a manner different from that illustrated so as to accommodate a particular cell construction. It is therefore contemplated that other modifications or applications will occur to those skilled in the art. It is acordingly intended that the appended claims shall cover all such modifications and applications as do not depart from the true spirit and scope of the invention.

What is claimed as new and desired to be secured by Letters Patent of the United States is:

1. A sealed galvanic cell, comprising:
   a generally tubular envelope having a mouth at one end thereof;
   a mass of electrolyte disposed in said envelope;
   an end cap having an inner and an outer surface and extending across the mouth of said envelope to seal the interior of the envelope, said end cap being formed of polysulfone;
   said end cap defining a vent passage extending therethrough for allowing gases to escape from within said envelope;
   a generally cylindrical plug formed of polysulfone disposed in said passageway, said plug having an uncompressed diameter greater than the diameter of said vent passage to provide a compressive fit therewith;
   the polysulfone of said end cap exhibiting a sufficiently low characteristic creep so that the pressure produced by the compressive fit remains substantially constant;
   an outer cap assembly disposed over said end cap; and
   terminal means extending through said end cap and into said electrolyte.

2. A sealed galvanic cell, comprising:
   a generally tubular envelope having a mouth at one end thereof;
   a mass of electrolyte disposed in said envelope;
   an end cap having an inner and an outer surface and having an area larger than the cross-sectional area of the mouth of said envelope and compressively seated in and extending across the mouth of said envelope to seal the interior of the envelope, said end cap being formed of polysulfone resistant to attack by said electrolyte, and exhibiting sufficient resiliency to allow compressive engagement within the mouth of said envelope, and further exhibiting an adequately low characteristic creep so that the pressure of said compressive fit remains substantially constant;
   said end cap defining a vent passage extending therethrough for allowing gases to escape from within said envelope;
   a generally cylindrical plug formed of polysulfone disposed in said passageway;
   an outer cap assembly disposed over said end cap; and
   terminal means extending through said end cap and into said electrolyte.

3. A cell according to claim 2, wherein at least a portion of said plug includes a hollow core therewithin.

4. A cell according to claim 2, wherein said passage terminates in an outer end spaced from said outer cap assembly by a distance at least equal to the axial length of said plug;
   whereby said plug may be urged outwardly from said passageway by pressure generated within said cell to allow pressurized material to escape from within the cell.

5. A cell according to claim 4, wherein said passage terminates in a counterbore extending to an outer surface of said end cap.

6. A cell according to claim 2, wherein said plug member is solid, and has no hollow core therewithin.

7. A sealed galvanic cell, comprising:
   a generally tubular metallic envelope forming a first electrode, and defining a mouth at one end thereof;
   a mass of electrolyte disposed within said envelope;
   a second electrode extending coaxially with said envelope and into said mass of electrolyte;
   an end cap having an inner and an outer surface and having an uncompressed area larger than the cross-sectional area of the mouth of said envelope and disposed across the mouth of said envelope for sealing the interior of the envelope, said second electrode extending through said end cap;
   outer cap means electrically coupled to said second electrode and overlying the outer surface of said end cap;
   a passage extending through said end cap and generally parallel to said second electrode for allowing pressure to escape from within said cell; and
   a plug member frictionally disposed in said passage, said plug member defining a generally centrally located, hollow core extending part-way through said plug member, wherein said end cap and plug member are formed of polysulfone.

8. A cell according to claim 7, wherein said venting passage terminates at an outer end, said outer end being spaced from said outer cap structure for allowing said plug member to be urged free of said passage.

* * * * *